(12) United States Patent
An et al.

(10) Patent No.: US 12,360,593 B2
(45) Date of Patent: Jul. 15, 2025

(54) ABSOLUTE PHASE UNWRAPPING FOR FRINGE ANALYSIS IN AN EYE TRACKING APPLICATION

(71) Applicant: Meta Platforms Technologies, LLC, Menlo Park, CA (US)

(72) Inventors: Yatong An, Redmond, WA (US); Youmin Wang, Bellevue, WA (US); Gaetano Aiello, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 168 days.

(21) Appl. No.: 18/110,725

(22) Filed: Feb. 16, 2023

(65) Prior Publication Data

US 2024/0061500 A1    Feb. 22, 2024

Related U.S. Application Data

(60) Provisional application No. 63/398,439, filed on Aug. 16, 2022.

(51) Int. Cl.
*G06F 3/01* (2006.01)
*G01B 11/25* (2006.01)
(Continued)

(52) U.S. Cl.
CPC ............ *G06F 3/013* (2013.01); *G01B 11/254* (2013.01); *G06T 5/10* (2013.01); *G06T 7/521* (2017.01);
(Continued)

(58) Field of Classification Search
CPC ........... G06F 3/013; G06T 7/521; G06T 5/10; G06V 10/141; G06V 10/60; H04N 23/11; G01B 11/254
See application file for complete search history.

(56) References Cited

U.S. PATENT DOCUMENTS

| 8,955,973 B2 | 2/2015 | Raffle et al. |
| 2013/0301002 A1* | 11/2013 | Gruppetta ................ A61B 3/14 351/246 |

(Continued)

OTHER PUBLICATIONS

An Y., et al., "Pixel-Wise Absolute Phase Unwrapping using Geometric Constraints of Structured Light System," Optics Express, vol. 24, No. 16, Aug. 8, 2016, pp. 18445-18459.

(Continued)

*Primary Examiner* — Mishawn N. Hunter
(74) *Attorney, Agent, or Firm* — Greenberg Traurig, LLP

(57) ABSTRACT

An eye tracking system for absolute phase unwrapping includes a fringe projector, a camera, and an illumination module. The projector provides a periodical fringe pattern onto the eye and the camera captures a reflection of the fringe pattern. Fourier transform, wavelet transform, phase shifting, and/or variants thereof may be used to determine a phase of the fringe pattern and generate a wrapped phase map. Spatial phase unwrapping is used for phase unwrapping resulting in a relative unwrapped phase map. The illumination module with a known relative position between the fringe projector and the camera is used to create glint(s) on the eye. Detected glints on the original image are used to convert the relative unwrapped phase map to an absolute unwrapped phase map.

19 Claims, 10 Drawing Sheets

(51) Int. Cl.
*G06T 5/10* (2006.01)
*G06T 7/521* (2017.01)
*G06V 10/141* (2022.01)
*G06V 10/60* (2022.01)
*H04N 23/11* (2023.01)

(52) U.S. Cl.
CPC ............ *G06V 10/141* (2022.01); *G06V 10/60* (2022.01); *H04N 23/11* (2023.01)

(56) References Cited

U.S. PATENT DOCUMENTS

| | | |
|---|---|---|
| 2015/0260509 A1 | 9/2015 | Kofman et al. |
| 2018/0007343 A1* | 1/2018 | Send .................... H04N 13/271 |
| 2023/0194882 A1* | 6/2023 | Yu .......................... G06F 3/013 |
| | | 359/13 |

OTHER PUBLICATIONS

Budianto B., et al., "Marker Encoded Fringe Projection Profilometry for Efficient 3D Model Acquisition," Applied Optics, vol. 53, No. 31, Nov. 1, 2014, pp. 7442-7453.
Cui H., et al., "A Flexible Phase-Shifting Method with Absolute Phase Marker Retrieval," Measurement, vol. 45, 2012, pp. 101-108.
Hua H., et al., "Video-Based Eyetracking Methods and Algorithms in Head-Mounted Displays," Optics Express, vol. 14, No. 10, May 15, 2006, pp. 4238-4350.

* cited by examiner

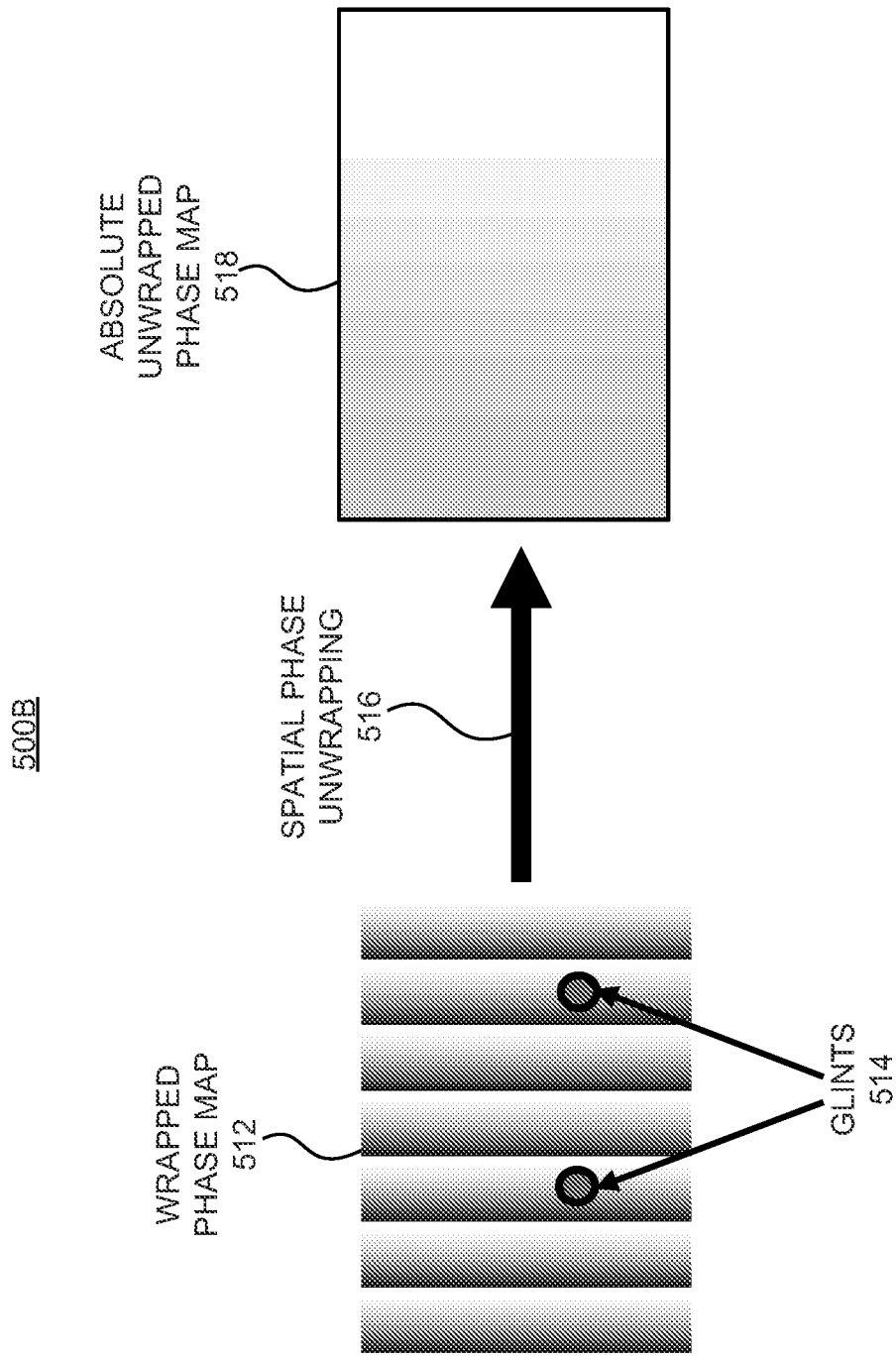

ABSOLUTE PHASE UNWRAPPING FOR FRINGE ANALYSIS IN AN EYE TRACKING APPLICATION

CROSS REFERENCE TO RELATED APPLICATIONS

This patent application claims priority to U.S. Provisional Patent Application No. 63/398,439, entitled "ABSOLUTE PHASE UNWRAPPING FOR FRINGE ANALYSIS IN AN EYE TRACKING APPLICATION," filed on Aug. 16, 2022.

TECHNICAL FIELD

This patent application relates generally to eye tracking in near-eye display devices, and in particular, absolute phase map generation in fringe projection based eye tracking systems using detected glints as reference anchors.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices may also present interactive content, where a user's (wearer's) gaze may be used as input for the interactive content.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 5B illustrates generation of an absolute unwrapped phase map from a wrapped phase map in the eye tracking system of FIG. 5A.

DETAILED DESCRIPTION

Figure 1:
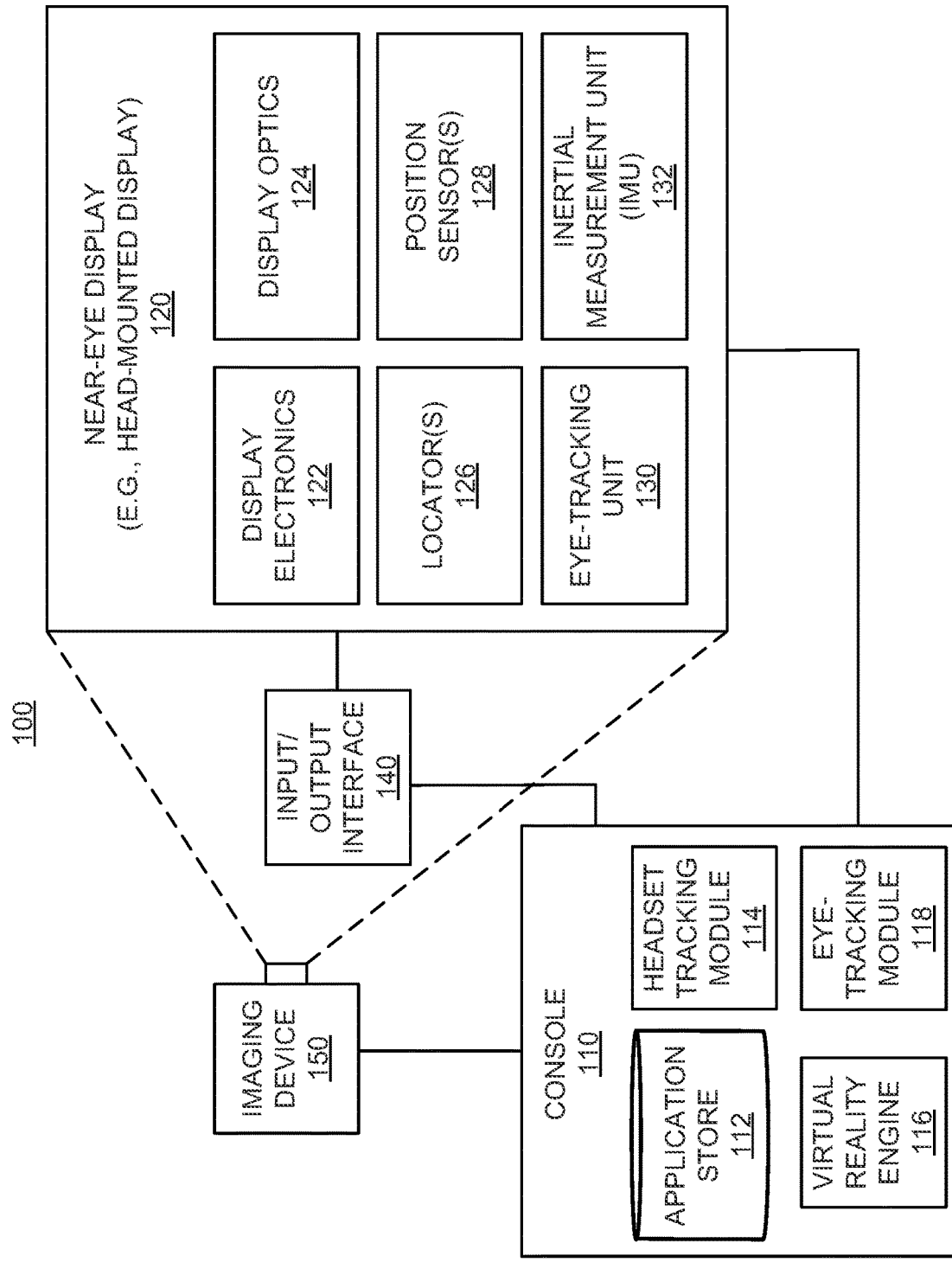
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Tracking a position and orientation of the eye as well as gaze direction in head-mounted display (HMD) devices may unlock display and rendering architectures that can substantially alleviate the power and computational requirements to render 3D environments. Furthermore, eye-tracking enabled gaze prediction and intent inference can enable intuitive and immersive user experiences adaptive to the user requirements in his/her interaction with the virtual environment.

Eye tracking may be achieved via a number of techniques. Fringe projection, which projects a periodical pattern onto the eye and uses the reflected pattern to determine 3D features, is one technique. Fringe patterns are periodical patterns. When a phase of the pattern is constrained to a particular interval, the phase of the fringe pattern is called a wrapped phase. Otherwise, the phase is called an unwrapped phase. To determine depth information and remove discontinuities, the phase of the captured fringe pattern may be unwrapped. One of the techniques for generating an unwrapped phase map is spatial phase unwrapping. Using an arbitrary starting point on the fringe pattern, some spatial phase unwrapping techniques may detect the discontinuities by analyzing the neighboring pixels to generate a relative unwrapped phase map, where the unwrapped phase map is relative to the starting point. However, the relative phase map may have an overall shift from the absolute unwrapped phase map, which may cause the reconstructed 3D shape to be distorted.

In some examples of the present disclosure, an eye tracking system for absolute phase unwrapping may include a fringe projector, a camera, and an illumination module. The fringe projector and the camera may form a structured light system, where the projector provides a periodical fringe pattern onto the eye and the camera captures the fringe pattern. Fourier transform, wavelet transform, phase shifting, and/or variants thereof may be used to determine a phase of the fringe pattern. A wrapped phase map may be generated. Spatial phase unwrapping, which analyzes discontinuities on the wrapped phase map may be used for phase unwrapping resulting in a relative unwrapped phase map. The illumination module with a known relative position between the fringe projector and the camera may be used to create glint(s) on the eye. Detected glints (by the camera) on the original image may be used to convert the relative unwrapped phase map to an absolute unwrapped phase map.

While some advantages and benefits of the present disclosure are apparent, other advantages and benefits may include reduction of computational resources and increased speed of eye tracking without added complexity to the eye tracking system. In some examples, an existing glint detection system may be used in conjunction with the eye tracking system.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (I M U) 132, internal to the inertial measurement unit (I M U) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
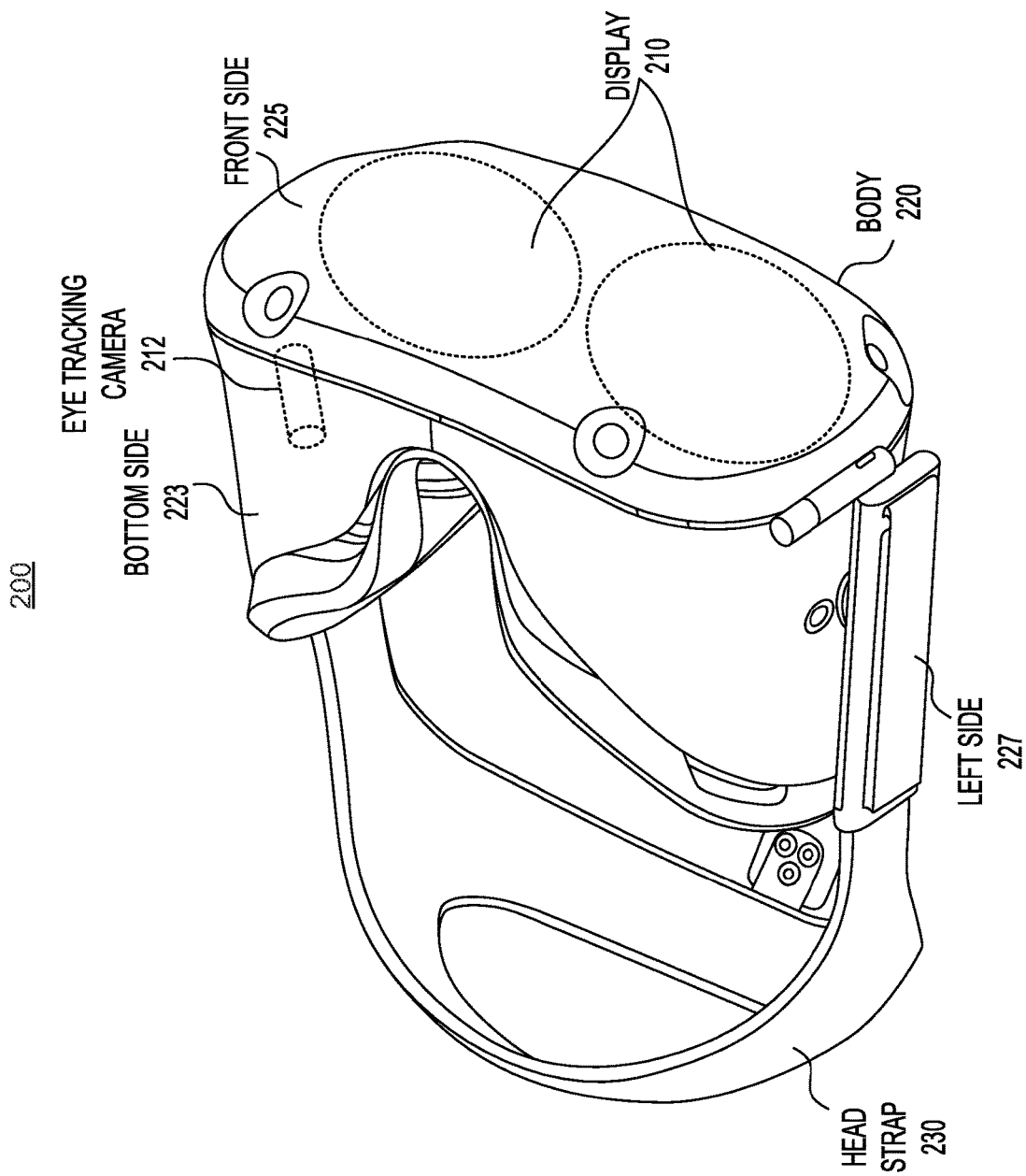
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the head-mounted device (HMD) device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface 140 for communicating with a console 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the virtual locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, the projector may provide a structured light (fringe pattern) onto the eye which may be captured by the eye tracking camera 212. The eye tracking camera 212 or a communicatively coupled processor (e.g., eye tracking module 118 in FIG. 1) may analyze the captured reflection of the fringe pattern and analyze to generate a phase map of the fringe pattern, which may provide depth information for the eye and its structures.

Figure 3A:
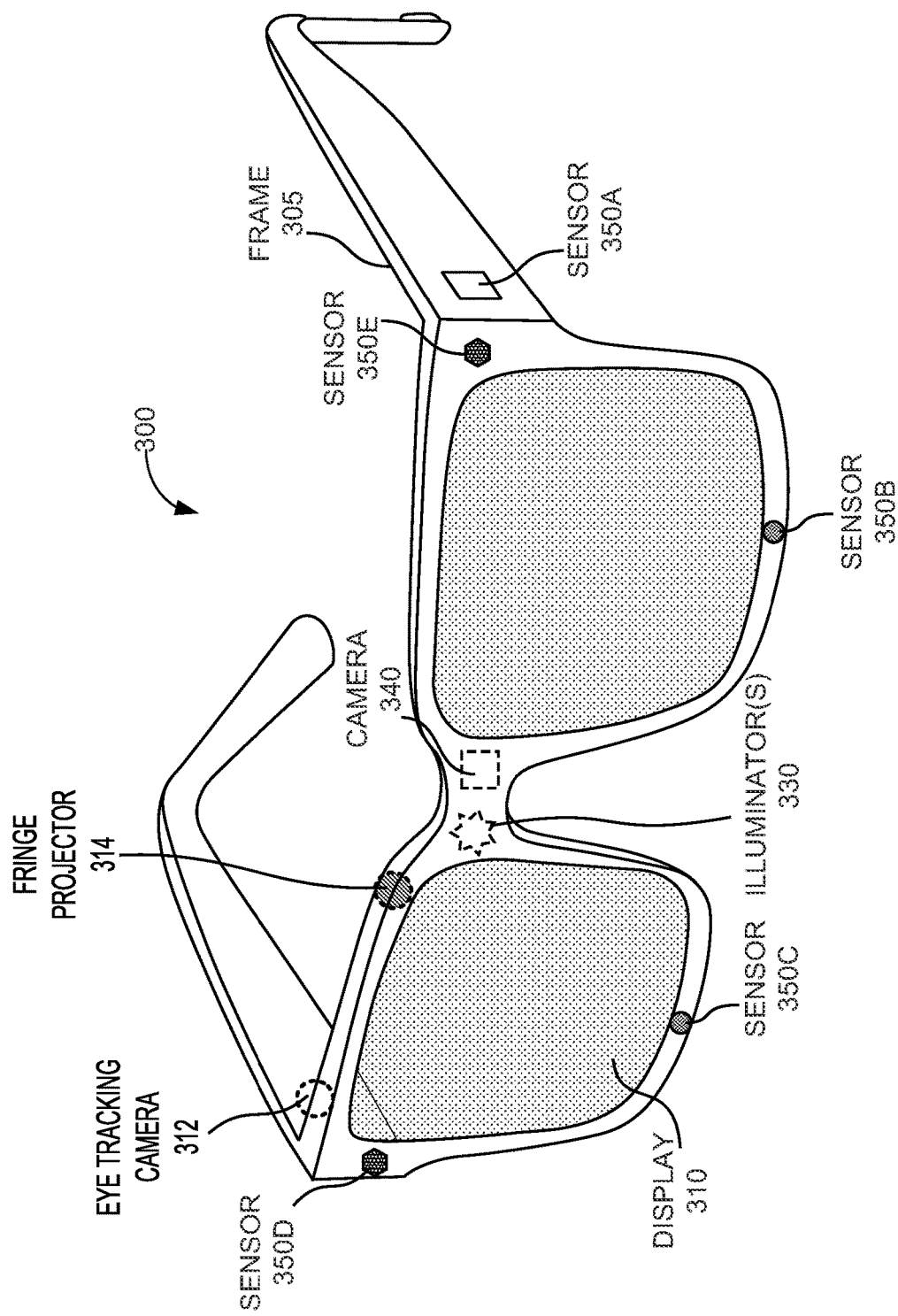
FIGS. 3A and 3B illustrate a perspective view and a top view of a near-eye display in the form of a pair of glasses, according to an example.

FIG. 3A is a perspective view of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display 300 may include a projector.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display 300 may also include an eye tracking camera 312

Figure 3B:
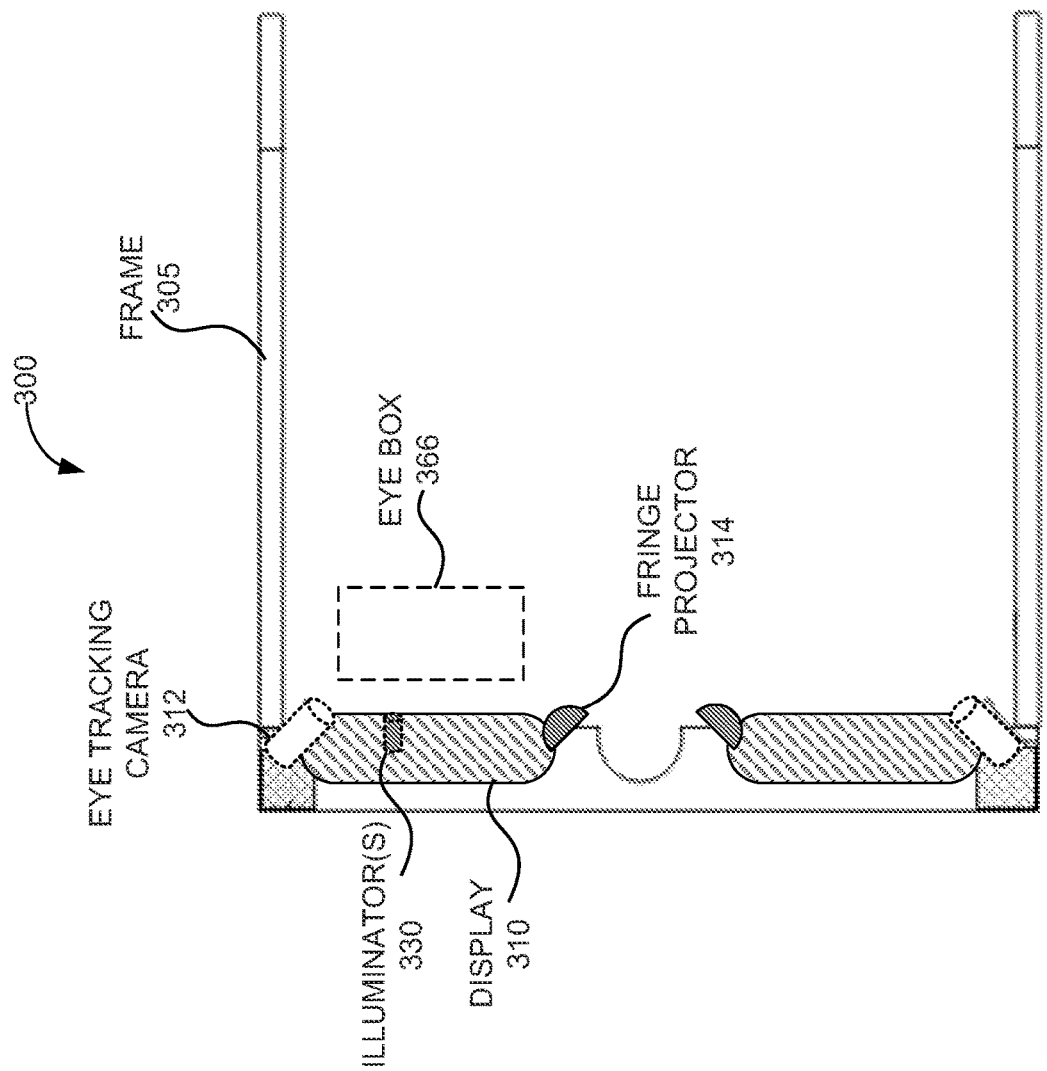

FIG. 3B is a top view of a near-eye display 300 in the form of a pair of glasses (or other similar eyewear), according to an example. In some examples, the near-eye display 300 may include a frame 305 having a form factor of a pair of eyeglasses. The frame 305 supports, for each eye: a fringe projector 314 such as any fringe projector variant considered herein, a display 310 to present content to an eye box 366, an eye tracking camera 312, and one or more illuminators 330. The illuminators 330 may be used for illuminating an eye box 366, as well as, for providing glint illumination to the eye. The fringe projector 314 may provide a periodic fringe pattern onto a user's eye. The display 310 may include a pupil-replicating waveguide to receive the fan of light beams and provide multiple laterally offset parallel copies of each beam of the fan of light beams, thereby extending a projected image over the eye box 366.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

The eye tracking camera 312 may be used to determine position and/or orientation of both eyes of the user. Once the position and orientation of the user's eyes are known, a gaze convergence distance and direction may be determined. The imagery displayed by the display 310 may be adjusted dynamically to account for the user's gaze, for a better fidelity of immersion of the user into the displayed augmented reality scenery, and/or to provide specific functions of interaction with the augmented reality. In operation, the illuminators 330 may illuminate the eyes at the corresponding eye boxes 366, to enable the eye tracking cameras to obtain the images of the eyes, as well as to provide reference reflections. The reflections (also referred to as "glints") may function as reference points in the captured eye image, facilitating the eye gazing direction determination by determining position of the eye pupil images relative to the glints. To avoid distracting the user with illuminating light, the latter may be made invisible to the user. For example, infrared light may be used to illuminate the eye boxes 366.

In some examples, the image processing and eye position/orientation determination functions may be performed by a central controller, not shown, of the near-eye display 300. The central controller may also provide control signals to the display 310 to generate the images to be displayed to the user, depending on the determined eye positions, eye orientations, gaze directions, eyes vergence, etc.

Figure 4A:
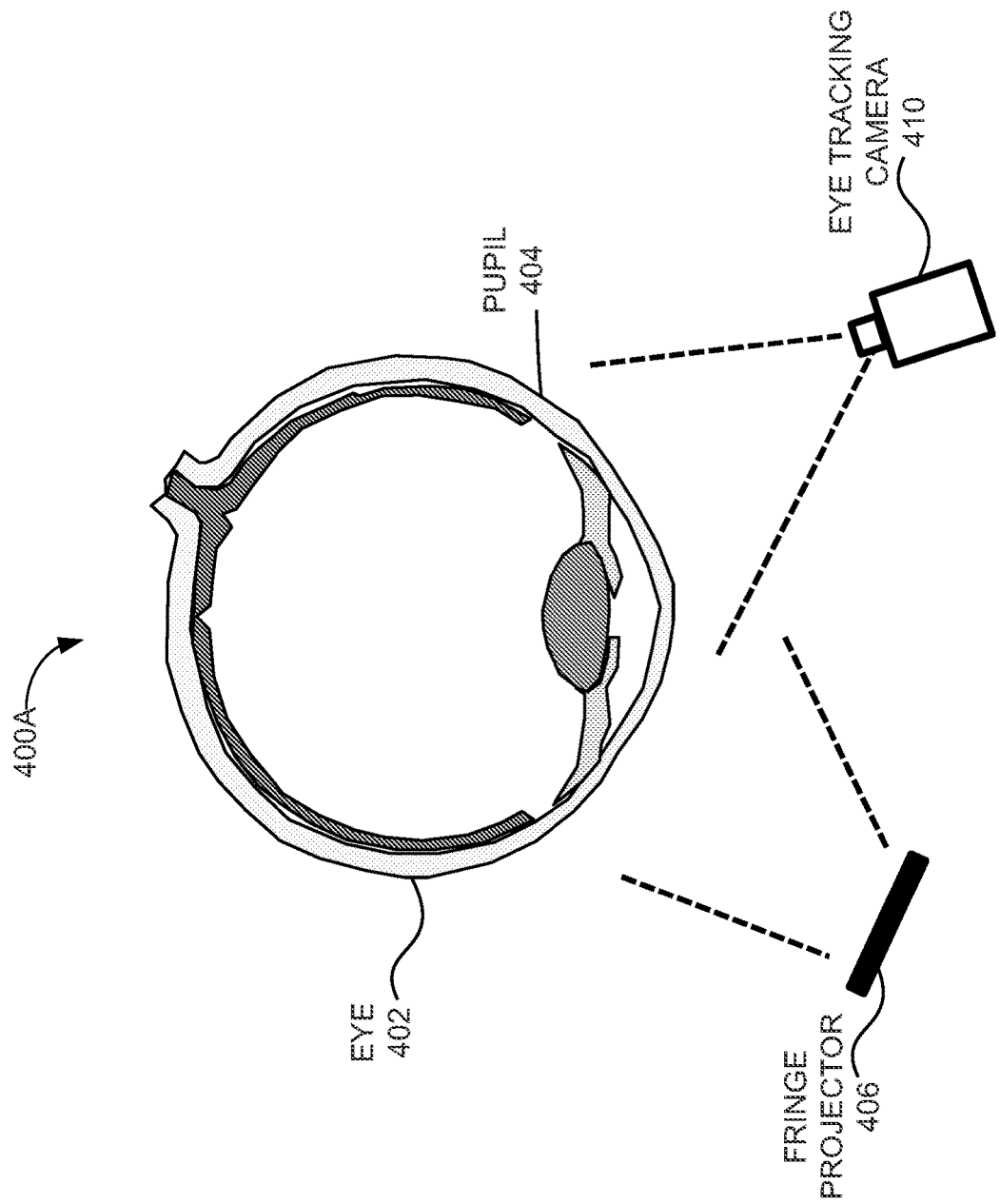
FIG. 4A illustrates a fringe pattern based eye tracking system.

FIG. 4A illustrates a fringe pattern based eye tracking system. Diagram 400A shows an eye 402 with a pupil 404, a fringe projector 406, and an eye tracking camera 410. As mentioned herein, eye tracking obtains data about a user's eye(s) such as detecting presence, attention, focus, a position of a person's pupil, and pupil size. Data points such as pupil position, gaze vector of the eye, gaze point, and eye openness may be computed from the captured eye tracking information. With the gathered data, images may be projected into the user's eye more accurately and user's intent may be detected (as input to an interactive display system, for example).

Accordingly, the fringe projector 406 may project a periodic fringe pattern onto the eye 402 (and the pupil 404). The reflected image may be captured by the eye tracking camera 410. The pattern in the captured image may be analyzed by the eye tracking camera or a processor on a near-eye display device or a communicatively coupled remote console.

Eye tracking may be achieved via a number of techniques. One such technique, fringe projection profilometry (FPP) is based on structured illumination for optical three-dimensional (3D) shape (i.e., the eye 402) measurement. Fringe projection profilometry (FPP) may provide a 3D topography of the eye in a non-contact manner, with high resolution, and fast data processing.

Figure 4B:
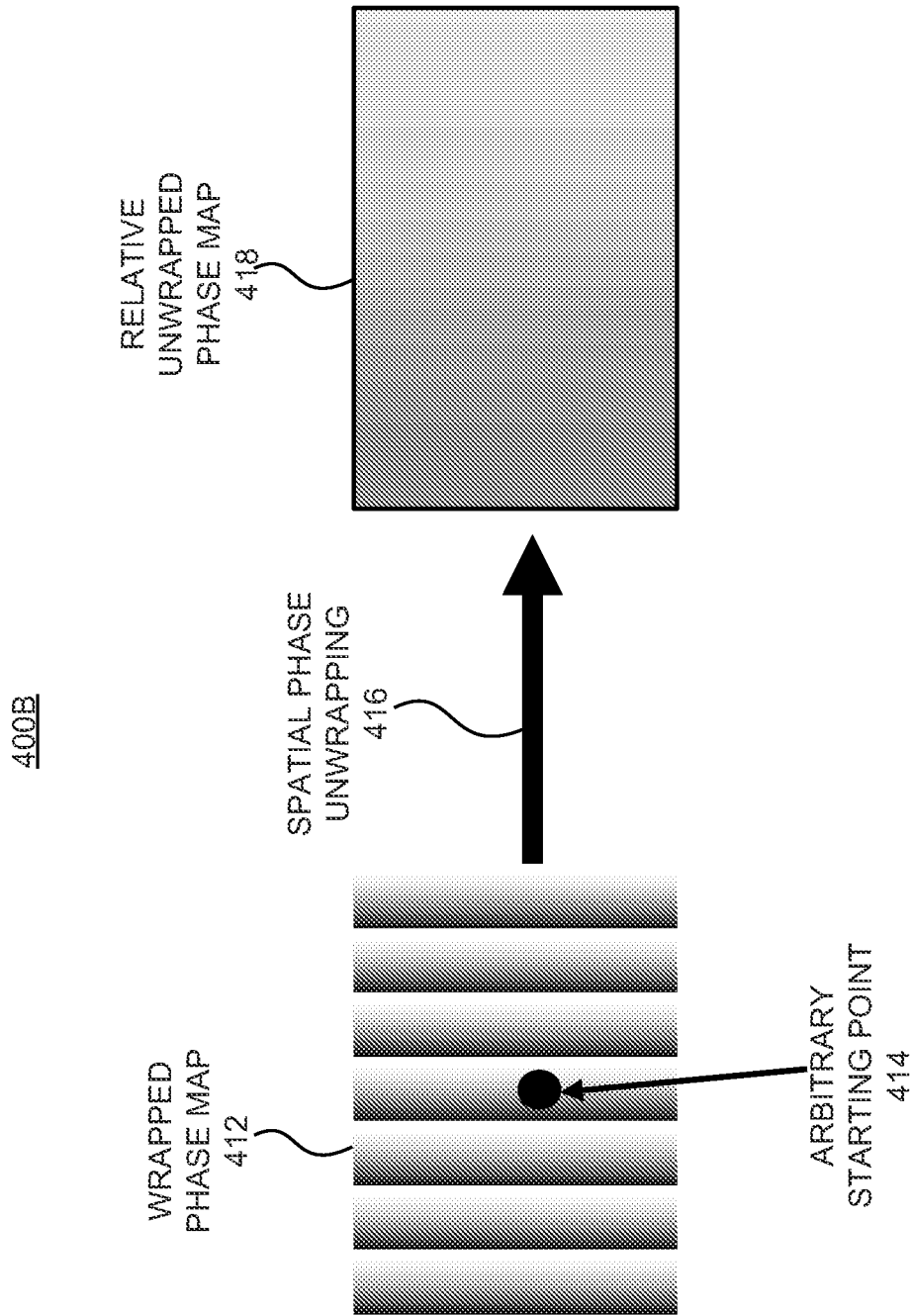
FIG. 4B illustrates generation of a relative unwrapped phase map from a wrapped phase map in the eye tracking system of FIG. 4A.

FIG. 4B illustrates generation of a relative unwrapped phase map from a wrapped phase map in the eye tracking system of FIG. 4A. Diagram 400B shows a wrapped phase map 412 generated from a captured image of a fringe pattern projected onto the eye. Spatial phase unwrapping 416 may be applied to the wrapped phase map 412 using an arbitrary starting point 414 to obtain a relative unwrapped phase map 418.

Fringe patterns are periodical patterns. When a phase of the pattern, $\varphi(t)$, is constrained to its principal value, (e.g., in the interval $(-\pi, \pi]$ or $[0, 2\pi))$, the phase of the fringe pattern is called a wrapped phase. Otherwise, the phase is called an unwrapped phase, which is a continuous function of time (t). Phase unwrapping is important in fringe pattern based eye tracking because only wrapped phase ranging from $-\pi$ to $+\pi$ is obtained through analyzing fringe pattern employing a phase-shifting technique, a Fourier transform technique, or a wavelet transform technique, and discontinuities in the phase map generated from fringe images need to be removed. To unwrap the phase and determine depth information, $2\pi$ discontinuous locations may be identified and removed by adding or subtracting multiple integer numbers of $2\pi$.

One fringe projection profilometry (FPP) approach is adaptive projection, which relies on fringe patterns with spatial pitch variation to achieve improved accuracy and coverage for an object being measured. However, modifying the projection pattern may add to complexity and processing time. Another approach is temporal phase unwrapping may obtain an absolute phase map in the sense that the unwrapped phase map has a deterministic correspondence relationship with the camera. Yet, temporal phase unwrapping techniques usually require additional patterns, which may slow the measurement speed and may not be suitable for dynamic scenes.

Spatial phase unwrapping techniques have the advantage of higher speed because additional patterns are not needed. Some spatial phase unwrapping techniques (spatial phase unwrapping 416) may set an arbitrary starting point 414 and then detect the discontinuities by analyzing the neighboring pixels to generate a relative unwrapped phase map 418, where the unwrapped phase map is relative to the arbitrary starting point 414. However, the relative phase map may have an overall shift from the absolute unwrapped phase map, which may cause the reconstructed 3D shape to be distorted.

Figure 5A:
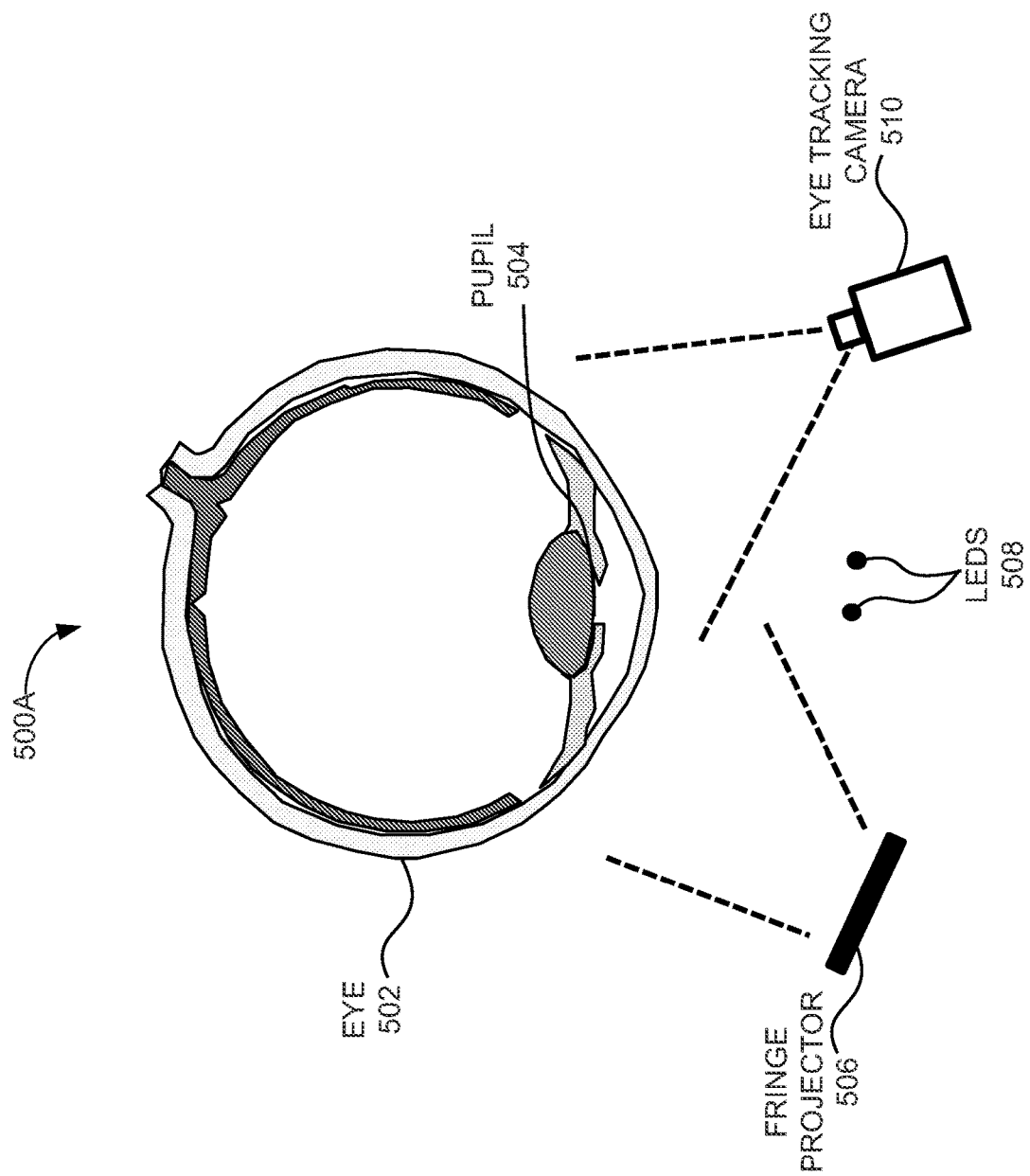
FIG. 5A illustrates a fringe pattern based eye tracking system, according to an example.

FIG. 5A illustrates a fringe pattern based eye tracking system, according to an example. Diagram 500A shows an eye 502 with a pupil 504, a fringe projector 506, an eye tracking camera 510, and one or more illuminators (light emitting diodes (LEDs) 508). As mentioned herein, spatial phase unwrapping techniques using an arbitrary starting point as reference generate a relative unwrapped phase map. In addition to (or in place of) the light emitting diodes (LEDs) 508, the one or more illuminators may also include a side-emitting laser diode, a vertical-cavity surface-emitting laser diode, or a superluminescent light-emitting diode.

Spatial unwrapping techniques are based on the phase smoothness assumption. They need only one phase map and phases are unwrapped from pixel to pixel by following a specified path. Spatial unwrapping only refers to the nearest pixel, and thus is vulnerable when the referred anchor is error prone. Spatial phase unwrapping unwraps the phase by referring phase values of other points on the same phase map through a local or global optimization. Regardless the robustness of a spatial phase unwrapping algorithm, it is fundamentally limited by the surface smooth assumption: the object surface has to be smooth to at least one unwrapping path such that the object surface geometry does not introduce more than TF phase changes between two successive points. In general, spatial phase unwrapping only provides a relative phase map for a smoothly connected patch. In other words, the recovered shape from a spatially unwrapped phase map is relative to a 3D point on the surface. The absolute position between different smooth patches cannot be recovered.

To obtain an absolute unwrapped phase map, the system shown in diagram 500B may be used in some examples, where the illumination by the light emitting diodes (LEDs) 508 may generate glints on the eye 502, which may be used as reference points in generating the absolute unwrapped phase map.

FIG. 5B illustrates generation of an absolute unwrapped phase map from a wrapped phase map in the eye tracking system of FIG. 5A. Diagram 500B shows a wrapped phase map 512, from which an absolute unwrapped phase map 518 may be generated through spatial phase unwrapping 516 with the help of glints 514 used as reference ("anchor") points on the wrapped phase map 512.

In some examples, the light emitting diodes (LEDs) 508 or similar illuminators may be used to generate glints on the eye surface, which may be used as anchors to generate the absolute unwrapped phase map 518 instead of setting an arbitrary starting point and analyzing the neighboring pixels to generate a relative unwrapped phase map relative to the starting point. The anchors (glints) may allow the generated phase map to be absolute.

In some examples, one illuminator (light emitting diode (LED)) may be sufficient to provide the anchor glint. Yet, any number of illuminators may also be used. For example, up to 8 to 10 light emitting diodes (LEDs) may be used in some practical implementations. In some implementations, the illuminators may be infrared or near-infrared (NIR) to avoid distraction of the user. Thus, a number and/or a position of the illuminators may be selected based on a number of design considerations. The illuminators may be positioned such that the glints are generated within a field of view (FOV) of the camera and in an overlapping region between the fringe projector and the camera though. In some examples, a near-eye display device may include a glint detection system. Accordingly, the fringe projector and the camera may be used in conjunction with the glint detection system to use an output of the glint detection system as reference anchors in generating the absolute unwrapped phase map.

Figure 6:
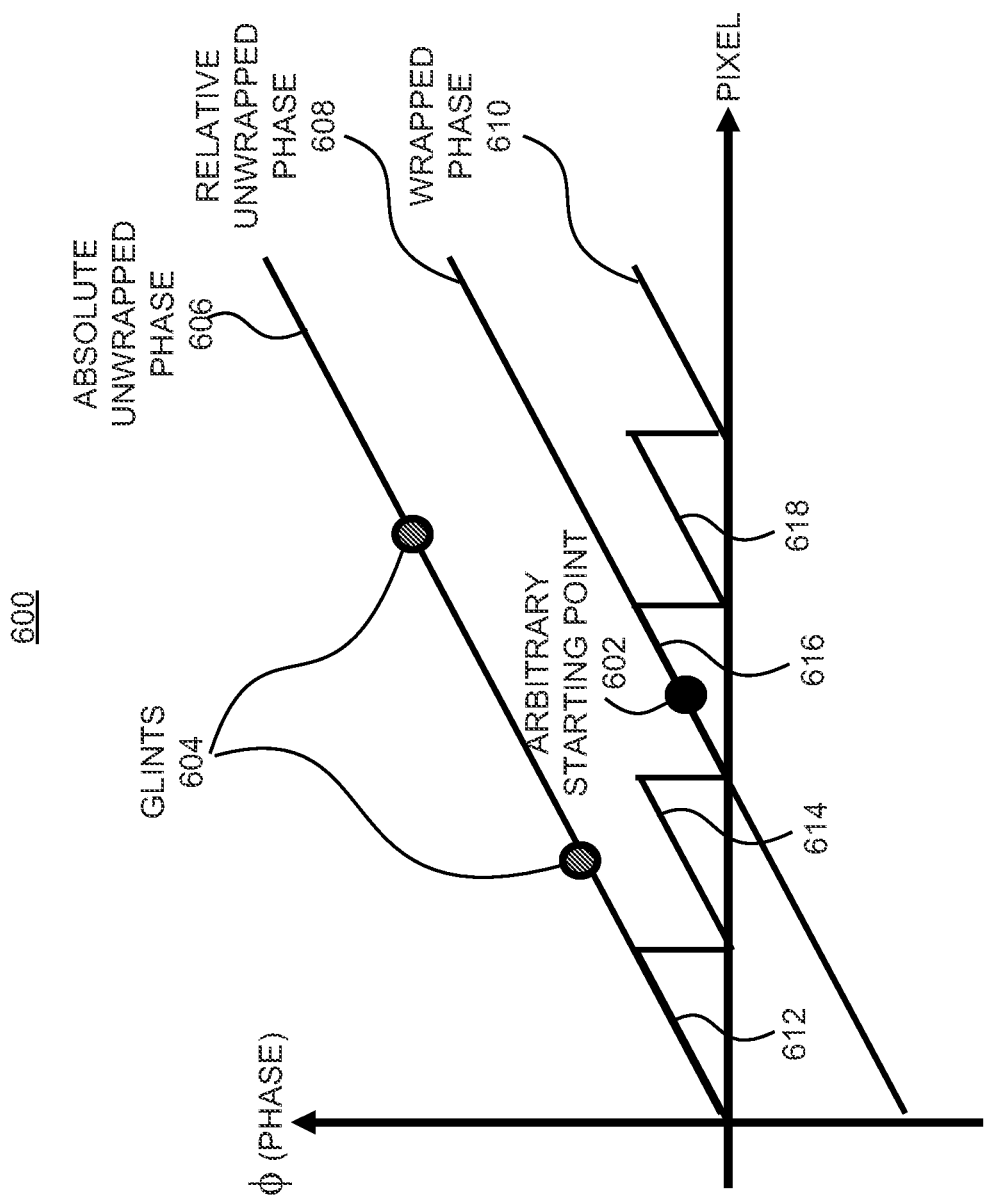
FIG. 6 illustrates a cross-section analysis diagram of absolute and relative unwrapped phases, according to an example.

FIG. 6 illustrates a cross-section analysis diagram 600 of absolute and relative unwrapped phases, according to an example. The diagram 600 shows wrapped phase 610 across phase ($\phi$) axis and pixel axis. As discussed herein, the wrapped phase obtained through analyzing fringe pattern employing a phase-shifting technique, a Fourier transform technique, or a wavelet transform technique may be constrained to its principal value, (e.g., in the interval $(-\pi, \pi]$ or $[0, 2\pi))$. The wrapped phase 610 ranging from $-\pi$ to $+\pi$ or 0 to $2\pi$, includes discontinuities at the transition between pixels 612, 614, 616, 618, etc. as can be in the diagram 600.

Relative unwrapped phase 608 and absolute unwrapped phase 606 are continuous functions of time (t) without the discontinuities of the wrapped phase 610. Relative unwrapped phase 608, as discussed herein, may be obtained using an arbitrary starting point 602. The disadvantage of the relative unwrapped phase 608 is that it may have a shift along the wrapped phase. For example, the relative unwrapped phase 608 may be on pixel 612, 614, 616, or 618.

The absolute unwrapped phase 606, on the other hand, is based on glints 604 as anchors and is therefore, absolute not relative, that is, the absolute unwrapped phase 606 may not shift as the relative unwrapped phase does. In some examples, one glint may be sufficient. In other examples, more than two (e.g., up to 10) glints may be used as anchors. In some examples, up to ten (10) illuminators may be used to generate glints.

The fringe projector and the camera may form a structured light system, where the projector provides a periodical fringe pattern onto the eye and the camera captures the fringe pattern. Fourier transform, wavelet transform, phase shifting, and/or variants thereof may be used to determine a phase of the fringe pattern. A wrapped phase map may be generated. Spatial phase unwrapping, which analyzes discontinuities on the wrapped phase map may be used for phase unwrapping resulting in a relative unwrapped phase map. The illumination module with a known relative position between the fringe projector and the camera may be used to created glint(s) on the eye. Detected glints (by the camera) on the original image may be used to convert the relative unwrapped phase map to an absolute unwrapped phase map.

Figure 7:
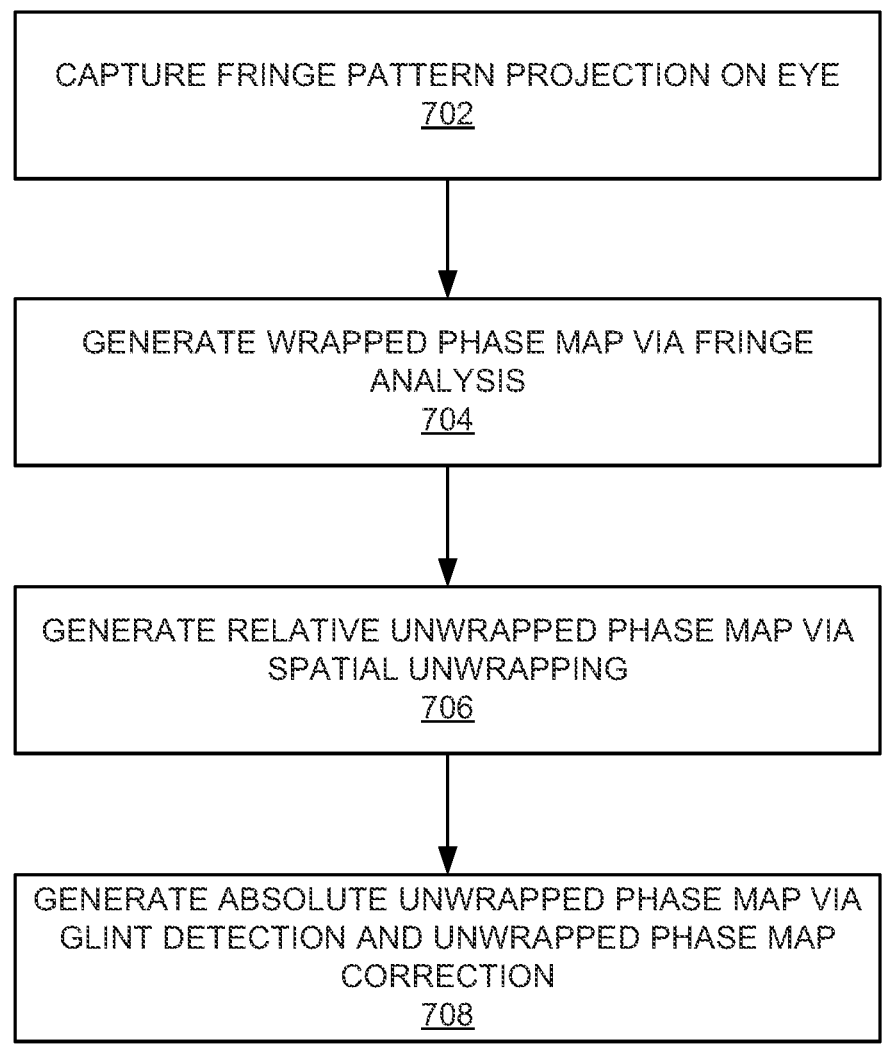
FIG. 7 illustrates a flow diagram for method generating an absolute unwrapped phase map using glint detection, according to some examples.

FIG. 7 illustrates a flow diagram for a method 700 generating an absolute unwrapped phase map using glint detection, according to some examples. The method 700 is provided by way of example, as there may be a variety of ways to carry out the method described herein. Although the method 700 is primarily described as being performed by the components of FIG. 5A, the method 700 may be executed or otherwise performed by one or more processing components of another system or a combination of systems. Each block shown in FIG. 7 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 702, a fringe pattern projected onto an eye may be captured by an eye tracking camera 312, for example. The fringe pattern may be structured light, thus a periodic pattern. A phase of the fringe pattern may provide depth information in analyzing a 3D structure of the object (i.e., the eye). In some examples, one or more illuminators 330 may be used to create glints on the eye, which may also be captured by the eye tracking camera 312.

At block 704, the captured fringe pattern may be analyzed using Fourier transform, wavelet transform, phase shifting, and/or variants thereof, and a wrapped phase map 512 may be generated.

At block 706, a relative unwrapped phase map 418 may be generated using spatial phase unwrapping 416. The spatial phase unwrapping may detect discontinuities in the wrapped phase map 412 by analyzing the neighboring pixels to generate the relative unwrapped phase map.

At block 708, an absolute unwrapped phase map 518 may be generated using glints 514 as anchors and correcting the relative unwrapped phase map. The absolute unwrapped phase map 518 may be tied to a specific phase, thus, may not have a shift as the relative unwrapped phase map.

According to examples, a method of making an eye tracking system for absolute phase unwrapping is described herein. A system of making the eye tracking system for absolute phase unwrapping is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An eye tracking system, comprising:
a fringe projector to provide structured light onto an eye;
one or more illuminators to generate glints on the eye;
an eye tracking camera to capture a reflection of the structured light and the glints on the eye; and
a processor communicatively coupled to the fringe projector, the one or more illuminators, and the eye tracking camera, the processor to:
generate a wrapped phase map from the captured reflection of the structured light and the glints on the eye;
generate a relative unwrapped phase map from the wrapped phase map using spatial phase unwrapping; and
generate an absolute unwrapped phase map from the relative unwrapped phase map using the reflection of the glints as anchors,
wherein the one or more illuminators are positioned such that the reflection of the glints is within an overlap region of the fringe projector and the eye tracking camera on a surface of the eye.

2. The eye tracking system of claim 1, wherein the structured light is a periodic fringe pattern.

3. The eye tracking system of claim 1, wherein the processor is to generate the wrapped phase map employing one or more of a Fourier transform, a wavelet transform, a phase shifting technique, or a variant thereof.

4. The eye tracking system of claim 1, wherein the one or more illuminators comprise a side-emitting laser diode, a vertical-cavity surface-emitting laser diode, a superluminescent light-emitting diode, or a light-emitting diode (LED).

5. The eye tracking system of claim 4, wherein the one or more illuminators emit one or more of visible light, infrared light, or near-infrared (NIR) light.

6. The eye tracking system of claim 1, wherein the one or more illuminators are positioned such that the reflection of the glints is within a field of view (FOV) of the eye tracking camera.

7. The eye tracking system of claim 1, wherein the one or more illuminators comprise up to ten illuminators.

8. The eye tracking system of claim 1, wherein the one or more illuminators are part of a glint detection system.

9. The eye tracking system of claim 1, wherein the processor is integrated into the eye tracking camera.

10. A method, comprising:
projecting, by a fringe projector, a structured light onto an eye;
generating, by one or more illuminators, one or more glints on the eye;
capturing, by an eye tracking camera, a reflection of the structured light and the glints on the eye;
generating, by a processor, a wrapped phase map from the captured reflection of the structured light and the glints on the eye;
generating, by the processor, a relative unwrapped phase map from the wrapped phase map using spatial phase unwrapping; and
generating, by the processor, an absolute unwrapped phase map from the relative unwrapped phase map using the reflection of the glints as anchors,
wherein the one or more illuminators generating the one or more glints on the eye are positioned such that the reflection of the one or more glints is within an overlap region of the fringe projector and the eye tracking camera on a surface of the eye.

11. The method of claim 10, wherein projecting the structured light onto an eye comprises:
projecting a periodic fringe pattern onto the eye.

12. The method of claim 10, wherein generating the wrapped phase map comprises:
employing one or more of a Fourier transform, a wavelet transform, a phase shifting technique, or a variant thereof.

13. The method of claim 10, wherein the one or more illuminators are positioned such that the reflection of the glints is within a field of view (FOV) of the eye tracking camera.

14. The method of claim 13, wherein generating the one or more glints by the one or more illuminators comprises:
emitting one or more of visible light, infrared light, or near-infrared (NIR) light.

15. A near-eye display device, comprising:
a display to provide an image on an eye box;
a fringe projector to provide structured light onto an eye;
one or more illuminators to generate glints on the eye;
an eye tracking camera to capture a reflection of the structured light and the glints on the eye; and
a processor communicatively coupled to the fringe projector, the one or more illuminators, and the eye tracking camera, the processor to:
generate a wrapped phase map from the captured reflection of the structured light and the glints on the eye;
generate a relative unwrapped phase map from the wrapped phase map using spatial phase unwrapping; and
generate an absolute unwrapped phase map from the relative unwrapped phase map using the reflection of the glints as anchors,
wherein the one or more illuminators are positioned such that the reflection of the glints is within an overlap region of the fringe projector and the eye tracking camera on a surface of the eye.

16. The near-eye display device of claim 15, wherein the processor is to generate the wrapped phase map employing one or more of a Fourier transform, a wavelet transform, a phase shifting technique, or a variant thereof.

17. The near-eye display device of claim 15, wherein the one or more illuminators:
emit one or more of visible light, infrared light, or near-infrared (NIR) light, and
are positioned such that the reflection of the glints is within a field of view (FOV) of the eye tracking camera.

18. The near-eye display device of claim 15, wherein the structured light is a periodic fringe pattern.

19. The near-eye display device of claim 15, wherein the processor is integrated into the eye tracking camera.

* * * * *